United States Patent [19]
Yu et al.

[11] Patent Number: 5,282,066
[45] Date of Patent: Jan. 25, 1994

[54] MULTIPLE LAYER HOLOGRAMS

[75] Inventors: Kevin Yu, Temple City; Khin S. Yin, Alhambra; John E. Wreede, Azusa, all of Calif.

[73] Assignee: Hughes Aircraft Company, Los Angeles, Calif.

[21] Appl. No.: 708,525

[22] Filed: May 31, 1991

[51] Int. Cl.$^5$ .............................................. G03H 1/28
[52] U.S. Cl. .......................................... 359/3; 359/22; 359/24; 359/900; 430/1; 430/2
[58] Field of Search ................... 359/3, 8, 14, 22, 24, 359/900; 430/1, 2

[56] References Cited

U.S. PATENT DOCUMENTS

| | | | |
|---|---|---|---|
| 3,667,946 | 6/1972 | Sturdevant | 359/3 |
| 4,139,388 | 2/1979 | Reich et al. | 359/3 |
| 4,378,141 | 3/1983 | Yevick | 359/3 |
| 4,530,564 | 7/1985 | Close | 359/3 |
| 4,601,533 | 7/1986 | Moss | 359/24 |
| 4,789,211 | 12/1988 | Wreede | 359/3 |
| 4,815,800 | 3/1989 | Chern et al. | 359/3 |
| 4,826,290 | 5/1989 | Wreede et al. | 359/3 |
| 4,942,102 | 7/1990 | Key et al. | 359/3 |
| 5,096,790 | 3/1992 | Monroe | 359/3 |
| 5,103,323 | 4/1992 | Magarinos et al. | 359/24 |

*Primary Examiner*—Martin Lerner
*Attorney, Agent, or Firm*—L. A. Alkov; W. K. Denson-Low

[57] ABSTRACT

Multiple layers or holographic exposures and methods for preparing multiple layers of holographic exposures are described. The multiple layers of holographic exposure combine to form holographic stacks and are fabricated from layers of exposed and processed photosensitive recording films, each of which has at least one independently recorded hologram. The holographic stacks are useful for providing wide bandwidth holograms and holograms having superimposed images.

4 Claims, 1 Drawing Sheet

MULTIPLE LAYER HOLOGRAMS

BACKGROUND OF THE INVENTION

1. Field of the Invention

The present invention relates in general to photosensitive polymer films which are used for recording high efficiency holograms. More particularly, the present invention relates to multiple layers of holographic exposures which combine to produce wide bandwidth and superimposed holograms.

2. Description of Related Art

Reflective display holograms have found utility in a wide variety of applications. In addition to their ornamental utility in pendants and jewelry, these holograms are also useful in optical display devices such as head-up displays and windshields which are designed to project images to a viewer. Reflective display holograms operate in the reflective mode and can be illuminated for visualization with white light without significant loss of resolution.

Reflective display holograms traditionally have been prepared by recording the hologram on a photosensitive dichromated gelatin recording medium and subsequently processing the recording to form the hologram. The dichromated gel recording systems consist of a film of the photosensitive dichromated gel on a glass or an optical quality substrate. During the recording process an object wave is reflected from a mirror located a short distance beyond the film of dichromated gel. The reflected object wave and a reference wave form interference fringes which are recorded on the film of dichromated gel.

Dichromated gel recording films are particularly useful for applications in which the desired bandwidth of the hologram is greater than about 30 nm. For example, the dichromated gel recording films can be recorded with a narrow bandwidth laser source. Then, subsequent to recording the laser interference pattern on the dichromated gel film, the film processing can be controlled in a manner which results in a wide bandwidth hologram. The dichromated gel recording films are also conveniently utilized in forming holograms having more than one superimposed image.

A persistent problem presented by dichromated gel holograms is their inherent susceptibility to attack by moisture. Due to the water soluble nature of the gels, great care must be taken during processing and subsequent use to insure that moisture is not present.

Recently, photopolymer recording mediums have been developed which overcome the moisture related problems associated with dichromated gels. These polymeric recording mediums are available from DuPont of Wilmington, Delaware and are generally referred to as holographic recording film (HRF). The exact composition of the photopolymer recording mediums is maintained as proprietary information by the film manufacturers. However, the polymeric recording films are known generally to include polymeric material, photoreactive monomers, initiators, plasticizers and other additives. Processing holographic recording films generally includes high intensity ultra violet radiation curing followed by heating the films in a bake step to finally develop the hologram.

One type of HRF is marketed by Dupont Co. Imaging Systems, Wilmington, Delaware under the trade name OMNIDEX. OMNIDEX photopolymer recording medium is available in a liquid form which can be applied to various surfaces to form an HRF. OMNIDEX photopolymer recording medium is also available as a prefabricated film which is sandwiched between two layers of MYLAR brand polyester. One of these layers is generally referred to as the base layer while the second layer is a thinner cover layer. The cover layer functions as a protective barrier and is particularly useful for preventing the layer of photopolymer from coming into contact with index matching oils during the recording process. The index matching oils interfere with the physical stability of the photopolymer and can decrease the usefulness of the photopolymer recording film.

Photopolymer holographic recording films are inherently resistant to attack by moisture. Accordingly, they are well suited for use in making high efficiency holograms which may intentionally or inadvertently come into contact with moisture. One disadvantage associated with these photopolymer based holographic recording films is that they provide restricted narrow bandwidth holograms. Inherently, the bandwidths of photopolymeric holograms are on the order of 25 nm and do not go beyond 30 nm.

As mentioned earlier there are applications in which a controlled bandwidth of several hundred nanometers is desired. There are additionally applications in which more than one and frequently several holographic superimposed images are desired. For example, windshields having one hologram for projecting images to a viewer and a second hologram which functions as a reverse light blocking hologram and prevents light from entering the car are being contemplated. Each of these holograms is independently recorded and frequently independently processed yet they are incorporated into a single device.

One approach to solving the problem related to obtaining a wide bandwidth hologram when using photopolymer holographic recording films is to bond together separately exposed and processed holograms, each having a different wavelength hologram. The combination of all the separate holograms in a stack results in an apparently single hologram diffracting at a wide range of wavelengths. The combination of all the separate holograms can also display a number of apparently superimposed images or recordings. This approach to overcoming the problems associated with the inherently narrow holographic bandwidths of photopolymer recording film has the disadvantage of having a potentially large number of bulky and potentially visually interfering adhesive layers.

Accordingly, it would be desirable to provide a method for preparing multiple independent layers of photopolymer based holograms wherein the combination of all the holograms diffracts at a wide range of wavelengths and wherein the multiple independent layers are not adhered together with bulk adding adhesive layers. It would also be desirable to provide a method for preparing a holographic stack of layers of photopolymer based holograms wherein the combination of holograms presents several superimposed images. It would also be desirable to provide a method for preparing a holographic stack in which the layers of photopolymer have a protective barrier during the recording process.

SUMMARY OF THE INVENTION

In accordance with the present invention, a holographic stack of more than one layer of recorded and processed photopolymer recording film is provided. Each of the layers of recorded and processed photopolymer recording film has at least one independently recorded hologram. The combination of all the layers of photopolymer results in an apparent single hologram which diffracts over a wide range of wavelengths. Alternatively, the combination of all the layers of photopolymer provide more than one superimposed holographic images which have been independently recorded.

The holographic stack of the present invention contains no adhesives between the layers of photopolymer recording film. Accordingly, the addition of bulk to the holographic stack is eliminated. Furthermore, the holographic stack of the present invention can be fabricated so that the layer of photopolymer is protected from contact with refractive index matching immersion oils during the exposure process.

The present invention is based upon the discovery that a layer of commercially available holographic photopolymer recording film (HRF) can be transferred to a first layer of photopolymer which has been previously exposed to form a holographic recording. The two layers adhere together and do not require additional adhesives to maintain the adherent bond. Subsequently, the second photopolymer layer can be recorded to form a second holographic exposure. The process of transferring photopolymer layers to a previously recorded photopolymer layer can be repeated an indefinite number of times to achieve the desired combination of holograms in the form of a holographic stack.

As a feature of the present invention the first photopolymer film can be provided on an optically clear substrate, such as glass or polycarbonate, before it is recorded to form a holographic exposure. As another feature of the present invention, a protective barrier can be formed on the outer surface of each photopolymer layer. This protective barrier prevents index matching immersion oils from physically interfering with the photopolymer layer during the exposure process. Preferably, the protective barrier is removed prior to transferring another layer of photopolymer onto a previously exposed photopolymer layer.

The holographic stacks are preferably prepared by recording a hologram on a holographic photopolymer recording film and then treating the recorded holographic recording film with ultra violet radiation. Preferably the holographic photopolymer recording film is a commercially available film which is supplied sandwiched between a polymeric base layer and a polymeric cover layer. The next step includes peeling the polymeric cover layer from the exposed and treated layer of holographic recording film and transferring a second layer of holographic photopolymer recording film onto the layer of exposed treated recording film. This second layer adheres to the first layer without the use of adhesives and it can be independently exposed and ultra violet light treated in the same manner as the first layer. This process can be repeated as many times as needed to achieve the desired combination of holograms.

The above-discussed and many other features and attendant advantages of the present invention will become apparent as the invention becomes better understood by reference to the following detailed description when considered in conjunction with the accompanying drawings.

DESCRIPTION OF PREFERRED EMBODIMENTS

The present invention provides holographic stacks of layers of recorded and processed photosensitive recording film which may be used for wide bandwidth holograms and superimposed holographic images. The holographic stacks of the present invention are particularly useful in applications utilizing photopolymer recording film to record holograms. Those skilled in the art will appreciate, however, that the holographic stacks of the present invention can be prepared from any photosensitive material in the form of films which can adhere to each other.

The present invention is based upon the discovery that certain photosensitive recording films can be transferred and stacked onto an outer surface of a previously recorded photosensitive recording film. The films adhere to each other and remain adherent during subsequent processing steps.

Figure 1:
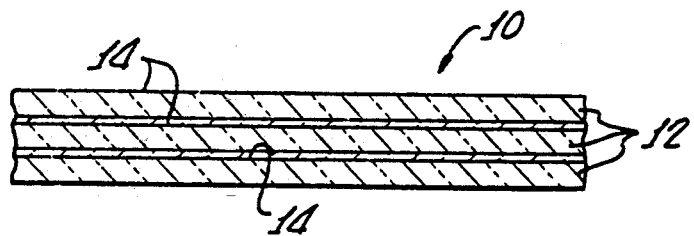
FIG. 1 is a representative holographic stack illustrating three layers of independently recorded and processed photosensitive recording film.

FIG. 1 illustrates an exemplary holographic stack 10 according to the present invention. The holographic stack includes a plurality of layers of independently recorded and processed photosensitive recording film 12. Each of the layers of exposed and processed photosensitive recording film has at least one outer surface 14 and at least one adjacent layer of photosensitive recording film. Each of the layers of photosensitive recording film 12 is located on at least one outer surface 14 of an adjacent layer of photosensitive recording film. The film can vary in thickness and typically range from approximately 4 microns to 35 microns.

In accordance with the present invention, the photosensitive recording film is preferably photopolymer recording film. The photopolymers which make up these films are typically prepared from photosensitive monomers and photoinitiators in response to exposure to electromagnetic radiation. A particularly suitable photopolymer recording film is a recorded and processed holographic photopolymer recording film marketed by Dupont Imaging Systems Division of Wilmington, Delaware under the trade name Omnidex. Omnidex is available in a laminate form in which photopolymer recording film is sandwiched between a base layer of MYLAR brand polyester and a cover layer of MYLAR. As discussed below, the photopolymer recording film can be removed from one or both of the MYLAR layers and transferred to an outer surface of a previously exposed layer of photopolymer recording film.

Figure 2:
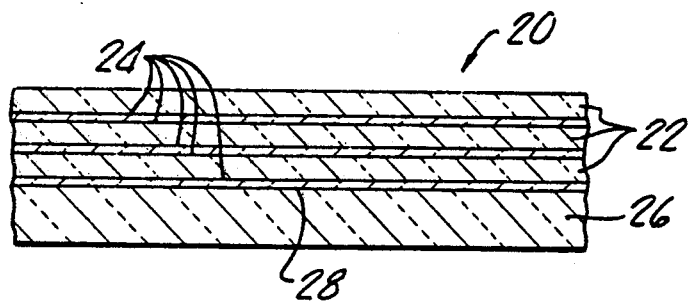
FIG. 2 is a representative holographic stack recorded on an optically clear substrate.

Another embodiment of the holographic stack of the present invention is illustrated in the holographic stack 20 of FIG. 2. The holographic stack 20 includes more than one layer of exposed and processed photosensitive recording film 22. The layers are positioned relative to each other in the same manner as described above for FIG. 1 That is, each of the layers of independently recorded and processed photosensitive recording film 22 has at least one outer surface 24, and at least one adjacent layer of recorded and processed photosensitive recording film. Each layer of recorded and processed photosensitive recording film is located on at least one outer surface of at least one adjacent layer of exposed and processed photosensitive recording film. FIG. 2 incorporates an additional feature in the form of an optically clear substrate 26 located on an outer surface of the holographic stack 28.

In accordance with the present invention the optically clear substrate 26 can be formed from any optical material having physical and chemical characteristics suitable for the intended use of the holographic stack. For most applications, the preferred substrate material is a combination of one or more common optical inorganic glasses, such as silica, BK-7, and B-270. Advantageously these glasses have excellent optical clarity and can be prepared in a variety of thicknesses and configuration. When Omnidex HRF is utilized in forming a holographic stack, glass substrates are preferably pretreated with a glass surface treatment agent such as silanizing compounds. This pretreatment provides the glass with surface characteristics which improve the contact between the Omnidex HRF and glass.

For applications in which the substrate preferably is very light weight, it is also within the scope of the present invention to utilize substrates prepared of organic polymers having a high degree of optical clarity such as polycarbonate and MYLAR polyester. Substrates of MYLAR are preferred when OMNIDEX HRF is utilized in preparing the holographic stacks. The substrates are commercially provided with the photopolymer recording film in place.

The substrate 26 can have a planar surface as shown in FIG. 2 or the substrate 26 can have a curved surface. When the substrate 26 has a curved surface, the holographic stack which incorporates the substrate also includes layers of exposed and processed photosensitive recording film in which the film has curved outer surfaces. Holographic stacks incorporating curved surface substrates are particularly adaptable to the teachings of the present invention because the layers of recorded and processed photosensitive recording film can be formed into stacks on curved surface substrates without voids or air pockets which would potentially interfere with the subsequent utility of the holographic stack.

The holographic stacks of the present invention can be fabricated using the following exemplary procedure. The first step includes providing a first layer of photosensitive recording film having at least one outer surface. Next, recording a hologram on the first layer of photosensitive recording film will form a first holographic exposure having an outer surface. The next step includes forming a second layer of photosensitive recording film onto the outer surface of the first holographic exposure. Then, recording a hologram on the second layer of photosensitive recording film will form a second holographic exposure. Finally, processing the first and second holographic exposure forms a holographic stack having independently recorded holograms. The process steps can be repeated an indefinite number of times to obtain a final holographic stack having numerous layers of exposed and processed photosensitive recording films.

In accordance with the present invention, providing a first layer of photosensitive recording film can be carried out by forming a layer of the photosensitive recording film by spin coating, dipping, spraying, or drawing techniques. Alternatively, the first layer of photosensitive recording film can be in the form of commercially available holographic recording films which are supplied sandwiched between layers of polymers. The Omnidex HRF available from Dupont and described above is one such commercially available recording film.

Recording a hologram on the first layer of photosensitive recording film can be accomplished by commonly used methods for recording holograms. These methods include utilizing refractive index matching immersion oils which are prevented from contacting the photopolymer film by a protective barrier which can be provided on an outer layer surface of the layer of photosensitive recording film. When the OMNIDEX photopolymer holographic recording film is utilized as the photosensitive material the outer cover layer of MYLAR acts as the protective barrier. Alternatively, water based polymers such as polyvinyl alcohols and gelatins can be formed over the layer of photosensitive recording film. These do not interact with the refractive index matching oils or the recording films.

After the first layer of photosensitive recording film is recorded to form a holographic exposure, the next step preferably includes the additional step of treating the first holographic exposure with high intensity ultra violet radiation for approximately 30 minutes to 60 minutes. This step is particularly important when a photopolymer holographic recording film, such as the OMNIDEX HRF described above, is utilized because the high intensity ultra violet radiation cures the photosensitive monomers and sets the first holographic image or interference pattern. This step allows the subsequent exposure of layers of holographic recording film without interfering with prior exposures.

If a protective barrier is utilized during the recording step, the protective barrier is preferably removed either prior to or subsequent to the high intensity ultra violet radiation treatment step. When the protective barrier is the outer MYLAR cover of a holographic photopolymer recording film the outer cover can be easily peeled from the photopolymer without damaging the holographic exposure. Removing the protective barrier is optional and it is within the scope of the present invention to allow the protective barrier to remain on the layers of photosensitive recording film.

Forming a second layer of photosensitive recording film onto the outer surface of the first holographic exposure layer can be carried out in a manner similar to that described above for forming the first layer of photosensitive recording film. For example, a layer of photosensitive recording film can be spin coated, drawn, or sprayed onto the outer surface of the first holographic exposure layer. A limitation to these approaches is that solvents or other additives utilized in the coating process can not interfere with previously exposed layer of photosensitive material.

As mentioned above, a particularly advantageous characteristic of the OMNIDEX holographic photopolymer recording film is that the MYLAR cover layer can be peeled from the layer of photopolymer exposing a layer of photopolymer recording film. Accordingly, when utilizing OMNIDEX HRF to prepare the holographic stacks of the present invention, forming a second layer of holographic photopolymer can be accomplished by peeling the MYLAR cover layer from an OMNIDEX HRF and transferring the photopolymer layer and MYLAR base onto the outer surface of the first holographic exposure.

Figure 3:
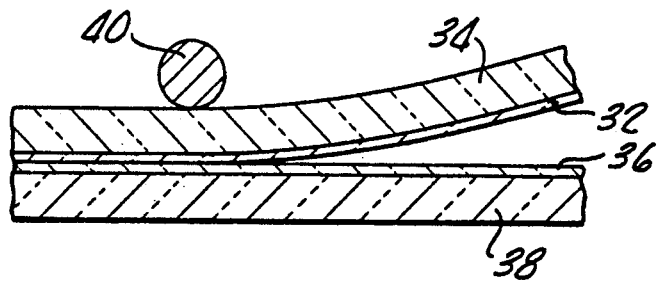
FIG. 3 illustrates a technique for transferring a layer of holographic photopolymer recording film onto a previously recorded holographic photopolymer recording film.

FIG. 3 illustrates an exemplary process of transferring a photopolymer film 32, having the MYLAR base 34 intact, onto a previously recorded layer of photopolymer film 36. The previously recorded layer of photopolymer film 36 is located on a base MYLAR substrate 38. This transfer process is conveniently accomplished by rolling the photopolymer film using a roller 40. The MYLAR base layer remains attached to the second layer of holographic photopolymer recording film forming a protective barrier located on an outer surface of the second layer of recording film. As described above the protective barrier prevents the layer of recording film from contacting refractive index matching immersion oils during the recording process.

Optionally, the rolling technique described above can also be utilized to transfer an OMNIDEX HRF film layer onto the surface of an optically clear substrate. For example, the MYLAR cover layer can be peeled away from the OMNIDEX HRF and the resulting recording film layer and MYLAR base layer can be rolled onto the optically clear substrate. In this case, the optically clear substrate replaces the MYLAR base layer as the substrate.

Recording a hologram on the second layer of photosensitive recording film and treating the second holographic exposure with high intensity ultra violet light is performed as described for the first layer of photosensitive recording film. Similarly, any protective barrier which is utilized can remain on the holographic exposure or it can be removed by simply peeling it from the surface of the exposure.

The process of transferring a layer of photosensitive recording film onto an outer surface of a previously recorded holographic exposure, recording the film, removing any protective barrier which may have been present during the recording, and treating the film with high intensity ultra violet radiation can be repeated as many times as needed to obtain a holographic stack having the desired band width or the desired number of superimposed images.

After each of the layers of photosensitive recording film have been formed and recorded the combination of all the layers is preferably baked at a temperature of approximately 100°–120° C., for approximately 1-2 hours. This provides a final set for the photopolymer to produce a stable holographic stack of independently recorded holograms. Alternatively, this baking step can be carried out subsequent to treating each of the holographic exposures with high intensity ultra violet light. It is, however, preferable to perform one baking step after all of the layers of photosensitive recording film are recorded. One reason for carrying out one baking step is that ultra violet radiation treated recorded holographic exposures provide a more suitable adherent outer surface for receiving subsequently formed or transferred photosensitive recording film than the ultra violet treated recorded holographic exposure which have also been baked.

The following non-limiting example illustrates a preferred method for preparing a holographic stack of the present invention utilizing OMNIDEX photopolymer holographic recording film.

EXAMPLE

OMNIDEX photopolymer recording film, grade HRF 352, was obtained from Dupont Imaging Systems, Wilmington, Delaware. The film is in the form of a layer of photosensitive photopolymer recording film sandwiched between a relatively thick base cover of MYLAR and a thinner cover layer of MYLAR. Due to the differences in the relative thicknesses of each of the covers, the cover layer is easier to remove from the layer of photopolymer recording film than the base layer. Taking advantage of this difference and in an appropriate dark room setting to protect the photosensitive film, the thin cover layer was peeled away from the layer of photopolymer recording film. The photopolymer recording film along with the intact base cover of MYLAR was then rolled onto a glass substrate using 2-5 psi.

After the layer of photopolymer recording film was rolled onto the glass substrate, a hologram was recorded on the layer of photopolymer recording film using refractive index matching immersion oils. The first hologram was recorded with an argon laser using an angle of 12 degrees between the reference beam and the object beam. The base cover of MYLAR acted as a protective barrier and prevented the immersion oils from interfering with the photopolymer during the recording process. Following the recording, the immersion oils were removed from the MYLAR base cover and the holographic exposure was treated with high intensity ultra violet radiation to fix the non-imaged portions of the recording film.

Since the glass substrate forms a much more adherent bond with the holographic exposure, the MYLAR base cover was easily peeled from the holographic exposure leaving an open outer surface of a holographic exposure. A second sample of HRF 352 was obtained and the MYLAR cover layer was peeled from the layer of photopolymer. Then the holographic photopolymer recording film was rolled onto the open outer surface of the holographic recording. A second hologram was recorded on this photopolymer recording film with an argon laser with an angle of about 25 degrees between the reference beam and the object beam. This holographic exposure was then treated with high intensity ultra violet radiation using 750 watts power at 365 nm at a distance of 12-15 inches. Again the immersion oils were removed from the MYLAR base plate which functioned as a protective barrier during the recording. The holographic stack was then baked at 100° C. for 30 minutes to further increase the diffraction efficiency of the holograms. The resulting holographic stack gives a holographic combination having a bandwidth of 45 nm which is over twice the 20 nm bandwidth of the individual holograms.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A process for preparing a holographic stack, said process comprising the steps of:

providing a first layer of photosensitive recording film, said layer of photosensitive recording film having a first outer surface and a second outer surface, wherein said first layer of photosensitive recording film is provided on an optically clear substrate, said optically clear substrate located on said first outer surface of said first layer of photosensitive recording film;

providing an optically clear protective barrier on said second outer surface of said first layer of photosensitive recording film;

recording a hologram on said first layer of photosensitive recording film to form a first holographic exposure, said first holographic exposure having an outer surface;

treating said first holographic exposure with high intensity ultra violet radiation;

forming a second layer of photosensitive recording film onto said outer surface of said first holographic exposure, said second layer of photosensitive recording film having at least one outer surface;

providing an optically clear protective barrier on said outer surface of said second layer of photosensitive recording film;

recording a hologram in said second layer of photosensitive recording film to form a second holographic exposure;

treating said second holographic exposure with high intensity ultra violet radiation; and processing said first holographic exposure and said second holographic exposure to form a holographic stack, wherein said processing includes the step of baking said holographic stack at a temperature of from approximately 100° C. to 120 ° C. for approximately 1 to 2 hours to finally set said holographic stack.

2. The process of claim 1 further including the step of baking said high intensity ultra violet radiation treated first holographic exposure at a temperature of from approximately 100° C. to 120° C. for approximately 1 to 2 hours to finally set said first recording film.

3. The process of claim 1 further including the step of removing said protective barrier subsequent to said recording on said first layer of photosensitive recording film.

4. A process for preparing a holographic stack, said process comprising the steps of:

providing a first layer of holographic photopolymer recording film having a first outer surface located on an optically clear substrate and a second outer surface located on a protective barrier;

recording a hologram on said first layer of holographic photopolymer recording film to form a first holographic exposure, said holographic exposure having an outer surface;

treating said first holographic exposure with high intensity ultra violet radiation;

removing said protective barrier from said outer surface of said first holographic exposure;

transferring a second holographic photopolymer recording film to said outer surface of said first holographic exposure, said second holographic photopolymer recording film having an outer surface and a protective barrier on said outer surface;

recording a hologram on said second layer of photopolymer recording film to form a second holographic exposure;

treating said second holographic exposure with high intensity uv radiation;

baking said treated second holographic exposure at a temperature of from approximately 100° to 120° C. for a period of from approximately 1 to 2 hours.

* * * * *